(12) United States Patent
Granlind

(10) Patent No.: US 6,612,601 B1
(45) Date of Patent: Sep. 2, 2003

(54) BOAT WAGON

(76) Inventor: Hans Ingmar Granlind, Jungmansgatan 21, S-740 71, Tullinge (SE)

( * ) Notice: Subject to any disclaimer, the term of this patent is extended or adjusted under 35 U.S.C. 154(b) by 0 days.

(21) Appl. No.: 09/673,799

(22) PCT Filed: Apr. 21, 1999

(86) PCT No.: PCT/SE99/00639
§ 371 (c)(1),
(2), (4) Date: May 2, 2001

(87) PCT Pub. No.: WO99/54165
PCT Pub. Date: Oct. 28, 1999

(30) Foreign Application Priority Data

Apr. 21, 1998 (SE) .............................................. 9801385
Apr. 21, 1998 (SE) .............................................. 9801386

(51) Int. Cl.[7] .............................................. B62D 63/00
(52) U.S. Cl. .................. 280/414.1; 280/42; 280/638; 280/656
(58) Field of Search .................. 280/414.1, 414.3, 280/656, 639, 42, 43, 43.23, 47.331, 47, 638, 35, 87.021, 87.05, 415.1, 47.18, 43.13; 414/458, 460, 476

(56) References Cited

U.S. PATENT DOCUMENTS

| | | | |
|---|---|---|---|
| 2,664,176 A | | 7/1953 | Livermon ................ 188/264 D |
| 3,356,239 A | * | 12/1967 | Klein ........................... 254/124 |
| 3,539,065 A | * | 11/1970 | Brownell ..................... 414/458 |
| 3,572,743 A | | 3/1971 | Parr .............................. 280/42 |
| 3,640,413 A | * | 2/1972 | Klein ......................... 214/396 |
| 4,029,227 A | * | 6/1977 | Martinez .................... 214/396 |
| 4,049,143 A | * | 9/1977 | Hatakka et al. .............. 214/390 |
| 4,232,879 A | | 11/1980 | Boxrud ........................ 280/656 |
| 4,664,401 A | | 5/1987 | Carrick ..................... 280/414.1 |
| 4,699,558 A | * | 10/1987 | Hagge et al. ................ 414/458 |
| 5,655,733 A | * | 8/1997 | Roach .......................... 244/50 |

FOREIGN PATENT DOCUMENTS

| | | | |
|---|---|---|---|
| EP | 0457621 A1 | * | 11/1991 |
| EP | 566 545 | | 10/1993 |
| SE | 465 026 | | 7/1991 |
| SE | 501 759 | | 5/1995 |
| SE | 511 923 | | 12/1999 |
| WO | 87/00807 | | 2/1987 |

* cited by examiner

Primary Examiner—Lesley D. Morris
Assistant Examiner—Daniel Yeagley
(74) Attorney, Agent, or Firm—Banner & Witcoff, Ltd.

(57) ABSTRACT

A boat wagon adapted to be pushed or moved along an underlying wagon supporting surface includes two legs and a legs interconnecting member. The horizontal distance between the legs can be adjusted. The legs interconnecting member is formed of a number of removable elements adapted to co-act with each other. The span between the legs is adapted for road transport by removing one or more of the removable elements. The legs can be adjusted to adapt to a second span for boat transport by fitting one or more of the removed elements to wagon related and leg associated sub-parts.

18 Claims, 4 Drawing Sheets

BOAT WAGON

FIELD OF INVENTION

According to one aspect, the present invention relates to a method of adjusting the horizontal distance or span between the legs of a U-shaped boat transporter, hereinafter referred to generally as boat wagon, that includes two legs and a part which interconnects the front parts of said legs.

According to a second aspect, the present invention relates to a boat wagon with which the horizontal distance between the legs, or the leg span, can be adjusted and fixed to a wagon width suited for road transport and to a wagon width suited for boat transport.

More specifically, the invention relates to a wagon which can be pushed along an underlying supporting surface by a vehicle or moved along said surface by machinery installed to this end, and even more particularly to a boat wagon intended especially for transporting boats over short distances, such as from a position in which the boat floats in water to a trestle structure on land, or vice versa. The boat wagon is also sometimes referred to as a trailer.

The invention particularly relates to a two-axle or multi-axle wagon which includes a frame structure, a number of wheels co-acting with said frame structure, at least one support means for supporting the forward part of the boat, and one support means for supporting the rear part of the boat.

It will be noted that by the term "axle" as used here and in the following description includes both a single axle and a bogie.

The present invention can be seen as a further development of the boat wagon illustrated and described in Swedish Patent Application 97 01221-5.

DETAILED DESCRIPTION OF THE BACKGROUND ART

Various types of wagons or trailers that are adapted to transport boats over short distances and which can be pushed or moved along an underlying support surface are known to the art.

One such wagon or trailer is illustrated and described in Swedish Patent Publication SE-C1-501 759, which clearly defines the earlier standpoint of techniques in the present regard.

With respect to features associated with the present invention, it should be mentioned that boat wagons that include a U-shaped frame structure with which the horizontal distance between the legs can be adjusted to correspond to the width of a boat are known to the art.

In this regard, it is known to include at the front part of respective legs a glide sleeve which is heavily dimensioned to accommodate torsional stresses and slideable along a cross beam which functions to interconnect said legs.

The length of the cross-beam is adapted to the greatest width or span between the legs.

Also known to the art are boat transport wagons that are equipped with a number of lashings for securing the hull of a boat to the wagon. Boat transport wagons that have fixed support points for holding the hull of a boat to the wagon.

SUMMARY OF THE INVENTION

TECHNICAL PROBLEMS

When taking into consideration the technical deliberations that a person skilled in this particular art must make in order to provide a solution to one or more technical problems that he/she might encounter, it will be seen that on the one hand it is necessary initially to realise the measures and/or the sequence of measures that must be undertaken to this end, and on the other hand to realise which means is/are required in solving one or more of said problems. On this basis it will be evident that the technical problems listed below are highly relevant to the development of the present invention.

When considering the present state of the art, as described above, it will be evident that a technical problem resides in providing structural details with the aid of simple means that will enable the legs of the U-shaped frame structure of a trailer or boat wagon, by all means of the kind defined in the introduction, to be adjusted to different spans, for instance to a narrow span at which the wagon can be moved conveniently along a road, such as along narrow road sections, and a broader span at which the wagon can stably transport broad boats.

Another technical problem is one of realising the benefits that are obtained when the leg-interconnecting member comprises several sub-parts or is telescopic so as to enable one and the same boat wagon to be adapted to a smallest width suitable for road transport to a width and configuration suitable for transportation of a given boat construction.

In addition, a technical problem resides in creating to this end conditions which will enable the leg-interconnecting member of the frame construction to be comprised of several sub-parts without deleteriously affecting the requisite mechanical strength and torsional rigidity of the leg-interconnecting member and without needing to provide glide sleeves for said legs.

With regard to the aspect of flexural rigidity, a further technical problem is one of allowing the leg-interconnecting member to consist of at least a number of readily removable sub-parts, so as to enable said leg-interconnecting member to be adjusted to a length that corresponds to the chosen distance between said legs.

Another technical problem is one of dimensioning said leg-interconnecting member and its sub-parts with requisite coupling means such that said sub-parts will exhibit a torsional rigidity and mechanical strength adapted to the construction of the boat wagon and dimensioned for a chosen maximum displacement or boat weight and/or weight distribution.

Yet another technical problem is one of realising the significance of providing mutually opposite end sections of a removable sub-part with first coupling means adapted for co-action with corresponding second coupling means belonging to adjacent leg-related sub-parts of said leg-interconnecting part, and to mutually adapt said second corresponding coupling means to form corresponded coupling means therebetween.

Another technical problem in respect of boat wagons of the kind in question resides in providing conditions with the aid of simple means such that each leg and associated wheels will be balanced as a unit and therewith be able to rest on an underlying surface without tipping.

Another technical problem with a boat wagon of the kind in question is one of providing conditions with the aid of simple means such that telescopically-related rods can extend parallel with said leg-interconnecting member or such that the interconnecting member can be formed telescopically.

Another technical problem with boat wagons of the kind concerned resides in the provision of conditions with the aid of simple means such that released or non-secured legs can be moved closer together or further apart with the aid of said steerable wheels and drive means constructed to this end.

Still another technical problem with boat wagons of the kind concerned resides in the provision of conditions with the aid of simple means that allow the leg-interconnecting member to be comprised of at least two parallel beam-sections of which each is provided with one or more readily removed sub-parts or, alternatively, are telescopically related.

When considering the prior state of the art as described above, it will be seen that a technical problem also resides in providing a simple construction for a two-axle wagon or trailer of the aforedescribed kind that cannot only be used to transport boats reliably with the aid of support straps or the like in a simple fashion, essentially regardless of the shape of the hull of the boat, but which will also enable the boat's attitude in relation to its horizontal plane to be readily adjusted, generally independently of the position or the status of the wagon at that moment in time, therewith enabling the position of the boat relative to the horizontal plane to be kept more or less constant despite pronounced changes in the attitude of the wagon as a result of moving up and down in the water or moving along a sloping or irregular surface and also of providing conditions in which each of two support means is able to utilize a respective rotatable or pivotal arm to move a support strap or belt up and down in a plane, or adjacent to a plane, which extends perpendicularly to the frame structure, whilst the keel of the hull is able to rest on a support plate.

It will also be seen that a technical problem resides in realising the advantages that are afforded when the support plate is mounted on a part of a leg-interconnecting member and is arranged for movement solely horizontally in the longitudinal extension of said interconnecting member, so as to enable the most forward part of the hull of said boat to be moved sideways when adjusting the position of the hull with one or both of said support straps.

Another technical problem is one of realising the significance of and the advantages afforded by allowing the forward part of the boat wagon to be raised and lowered through the medium of piston-cylinder devices active between the forward steerable wheels and the wagon frame-structure.

In the case of this latter application, another technical problem is one of realising the benefits that are afforded when the side-mounted piston-cylinder devices are connected in parallel so that the two such devices will generate mutually identical pressure forces on the one hand and provide a pendulating function on the other hand, so as to compensate for irregularities and unevenness in the surface on which the wagon is supported.

SOLUTION

With the intention of solving one or more of the aforesaid technical problems, the present invention takes as its starting point a wagon or trailer of the aforesaid construction that can be pushed or moved along an underlying surface supporting said wagon.

The invention relates to a method of adjusting the distance between the legs of a U-shaped boat wagon to a span suitable for road transport and to a span suitable for boat transport.

The invention also relates to a boat transport wagon where the leg-interconnecting member is a multi-part structure in which the parts removably co-act with each other and/or co-act telescopically with each other, where one or more removed parts and/or telescopically compressed parts result in a span between the legs and therewith a wagon width that is suitable for road transport, and where one or more additional parts fitted to said member and/or a part or parts telescopically extended from a telescopic member will result in a leg span suitable for boat transport.

According to proposed embodiments of the invention, the boat transport wagon comprises a frame structure, a plurality of wheels which co-act with the frame structure and which are allocated one front steerable and load-bearing axle and at least one rear load-bearing axle, at least one support means for supporting the forward part of the boat, and a support means for supporting the stern-part of the boat, wherein the frame structure has a U-shape in the horizontal plane, wherein the outer parts of respective legs co-act with wheels mounted on the rear load-bearing axles whereas a member that interconnects the inner parts of the legs co-acts with wheels mounted on the front, steerable axles, wherein the support means for supporting the forward or midship region of the boat can be raised and lowered by means of two parallel, hydraulically activatable, side-mounted piston-cylinder devices, and the support means for supporting the stern region of the boat can also be raised and lowered by means of two parallel, hydraulically activatable and side-mounted piston-cylinder devices.

The present invention also utilises the earlier known feature of including in the support means for supporting the forward region and/or midship region of the boat and the support means intended for supporting the stern region of the boat a respective belt, prop, support strap or like device.

In the case of a wagon of this nature, it is also proposed that the leg-interconnecting member is comprised of a number of sub-parts of which at least one can be readily removed, that mutually opposing end regions of said removable sub-parts are provided with first coupling means for co-action with corresponding second coupling means on adjacent leg-related sub-parts of said leg-interconnecting member, and that said second corresponding coupling means are also adapted to form corresponding coupling means between themselves.

According to one embodiment, the interconnecting member has the form of a beam structure.

The first and the second coupling means will conveniently comprise flanges and screw joints.

It is also proposed that each leg and its associated wheels shall be balanced and capable of supporting against an underlying surface in an upright position.

According to another embodiment, telescopically related rods extend parallel with said interconnecting member.

In the case of a divided interconnecting member, the legs can be moved apart or closer together by means of said steerable wheels and with the aid of drive machinery.

It is also proposed that said interconnecting member comprises at least two parallel beam sections that each have a readily removed centre sub-section.

It is specifically proposed by the present invention that a support plate mounted on a boat wagon adapted for the forward region of the hull of the boat shall be mounted on a central or midway sub-part of an interconnecting member and be movable horizontally in the longitudinal extension of said member, so as to be able to move the most forward part of the hull sideways when adjusting the position of the hull with the aid of one or both of said support straps.

It is also proposed to enable the forward part of the boat wagon to be raised and lowered with the aid of side-mounted piston-cylinder devices that act between the front steerable wheels and the wagon frame-structure.

In this latter application, it is proposed that the side-mounted piston-cylinder devices are connected in parallel so that both devices will generate the same pressure forces on the one hand, and so as to provide a pendulating function on the other hand, therewith enabling irregularities in the underlying wagon supporting surface to be compensated for or taken-up without appreciably changing the position of the wagon.

ADVANTAGES

Those advantages that are primarily characteristic of an inventive boat wagon reside in the provision of conditions which enable the total width of the wagon and the span between the legs of the U-shaped frame structure to be readily adjusted to a width or span suitable for road transport or to a width or span suitable for boat transport, with the aid of a multi-part leg-connecting member.

Another advantage is that the position of the hull of a boat supported by the wagon can be easily adjusted by resting the forward region of the hull on a horizontal support plate which can move along the interconnecting member.

BRIEF DESCRIPTION OF THE DRAWINGS

The invention will now be described in more detail with reference to an exemplifying embodiment of a boat wagon having features according to the invention, and also with reference to the accompanying drawings, in which.

DETAILED DESCRIPTION OF EMBODIMENTS AT PRESENT PREFERRED

Figure 1:
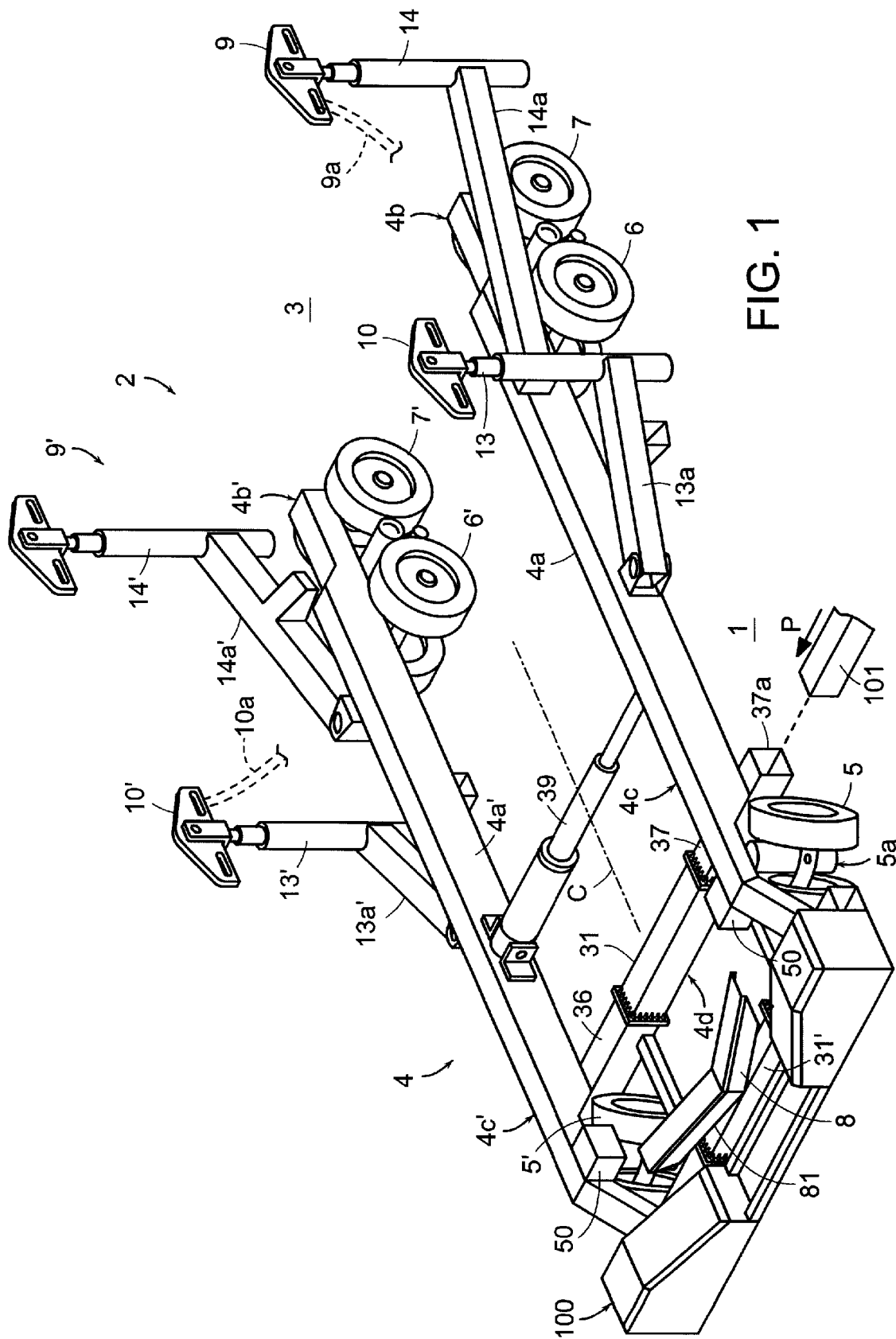
FIG. 1 is a simplified side-view perspective illustration of a boat transport wagon that includes front and rear support means and a U-shaped frame structure, said Figure showing the legs of said frame structure adjusted to a wide span for accommodating the hull of a boat.

FIG. 1 illustrates schematically and from one side a boat wagon or boat transporter 2 which is moveable along an underlying surface 1 and which is constructed and adapted for the transportation of a not shown boat (3). The boat wagon 2 comprises a frame structure 4, a number of wheel-pairs which co-act with said frame structure, where the front wheel pair on the left of the Figure has been designated 5, 5' (each being allocated a front axle) and the two wheel pairs shown to the right of FIG. 1 have been designated 6, 6'; 7, 7', and are each allocated a respective rear axle. The illustrated wagon also includes first support means 8 for supporting the forward part or midship's part of the boat, and a second support means 9, 9' for supporting the stern part of said boat.

The wagon also includes support means 10, 10' which are mounted midway of the frame structure and which are of the same construction as the support means 9, 9'. These midway support means 10, 10' may also be intended to support the forward part of the boat.

The frame structure 4 has a generally U-shape, where the outer parts 4b (4b') of a respective leg 4 (4a') of the U co-act with respective two wheel-pairs 6, 7 (6', 7').

A part 4d which interconnects the inner parts 4c, 4c' of the legs co-acts with the wheel-pairs 5, 5', which are load-carrying and steerable.

Respective support means 9, 9' or 10, 10' are comprised of two telescopically related props mounted on a respective side of the frame structure and capable of being raised and lowered by means of a respective piston-cylinder device 13, 13' and 14, 14', and further comprise a belt or carrier strap 9a, 10a extending between the props, and arms 13a, 13a' and 14a, 14a' which are rotatably or pivotally mounted in the legs 4a, 4a' of the frame structure and carry respective props.

In the illustrated case, the support means for supporting the forward and/or midship's part of the boat is a two-part structure, of which one part 10 and 10' comprises a belt or a support strap 10a which can be raised and lowered by means of hydraulically activatable, telescopically related posts or props, in the form of two piston-cylinder devices 13, 13', while the other part 8 is comprised of a V-shaped support plate.

The support means 9 and 9' for supporting the stern part of the boat is comprised of a belt (a support strap) 9a whose end-parts co-act fixedly with a respective hydraulically activatable, telescopically related post or prop, in the form of piston-cylinder devices 14, 14', by using known fastener means to this end.

Each prop-functioning hydraulically activatable piston-cylinder device 13 and 13' for the support means 10 and 10' intended for supporting the forward part of the boat are fastened to an outer part of an arm 13a and 13a' pivotally mounted on a respective leg 4a, 4a'of the frame structure 4, said pivotal attachment being located on the forward part of the leg 4a and intended to allow respective arms 13a, 13a' to move horizontally towards and away from the centre line "C" of said frame structure 4. Although not shown in the drawings, support shoulders are provided on the side of respective legs 4a, 4a'.

In the illustrated case, the settings of the pivotal attachment may automatically conform to the width of the hull of the boat, when the arms 10 and 10' are able to move freely in the horizontal plane.

However, one of the arms or both of said arms for one or both of the support means may be locked in a chosen setting, or may be adjustable with the aid of hydraulic auxiliary means not shown.

To enable a boat to be centred on the wagon 2, for instance when taking the boat out of the water, the front and/or the rear arm of the front 10, 10' and rear 9, 9' support means is/are locked on one side of the wagon corresponding to the width of the boat concerned. Alternatively, the construction may be such as to enable one or both arms to be moved hydraulically away from or towards each other so as to adjust said arms for centring of the hull of the boat in the wagon.

This ensures positive and controlled handling of the boat. Each of the hydraulic piston-cylinder devices 14 and 14' of the stern-supporting means 9 and 9' is attached to an outer part of an arm 14a and 14a' pivotally mounted midway on respective legs 4a and 4a'.

FIG. 1 indicates at 100 a pressure-oil supply system which can be used, among other things, for raising and lowering the telescopic devices 13, 13' and 14, 14'.

The illustrated embodiment of the boat wagon 2 is based on the provision of at least three support means, a support plate 8 adapted for supporting the most forward part of the boat, a support means 9, 9', 9a for supporting the stern part of the boat, and a support means 10, 10', 10a for supporting the midship's part of the boat, including two support means that can be raised and lowered by a respective hydraulically activatable piston-cylinder device. The support plate 8 can not be raised and lowered by means of a piston-cylinder arrangement.

One of said support means, in the illustrated case the forward support means 8, has the form of a support plate 82. The plate 82 is designed to co-act supportingly with the forward part of the keel of the boat, and remaining support means 10, 9 include, among other things, either a belt, a hawser, a cable, a rope, a support strap or the like and co-act with the midship-part and the stern-part of the boat 3.

The support plate 82 functioning as said support means 8 constitutes the most forward support means, although it may be a midship located support means. The support plate 82 has an upwardly facing, slight V-shape, or some similar shape, for centring the keel of the boat in relation to the wagon.

In the case of the illustrated embodiment, the support means 8 is placed adjacent to and forwardly of the front load-bearing axles.

The illustrated boat wagon 2 is comprised of three mutually co-actable parts, i.e. a front part and the two legs (4a, 4a').

The parts are bolted together at the section lines 20, 21. The wagon can be transported more readily when dismantled. The possibility of dismantling said three parts also facilitates surface treatment of the wagon, among other things.

The loads exerted by the side-mounted lifting devices can be taken-up, by positioning the support plate 82 centrally.

The axles of the wheel pairs 5, 5' are rotatably mounted for rotary movement about a vertical line perpendicular to the centre line "C" and can be locked in a given position by means of said piston-cylinder arrangement.

Figure 3:
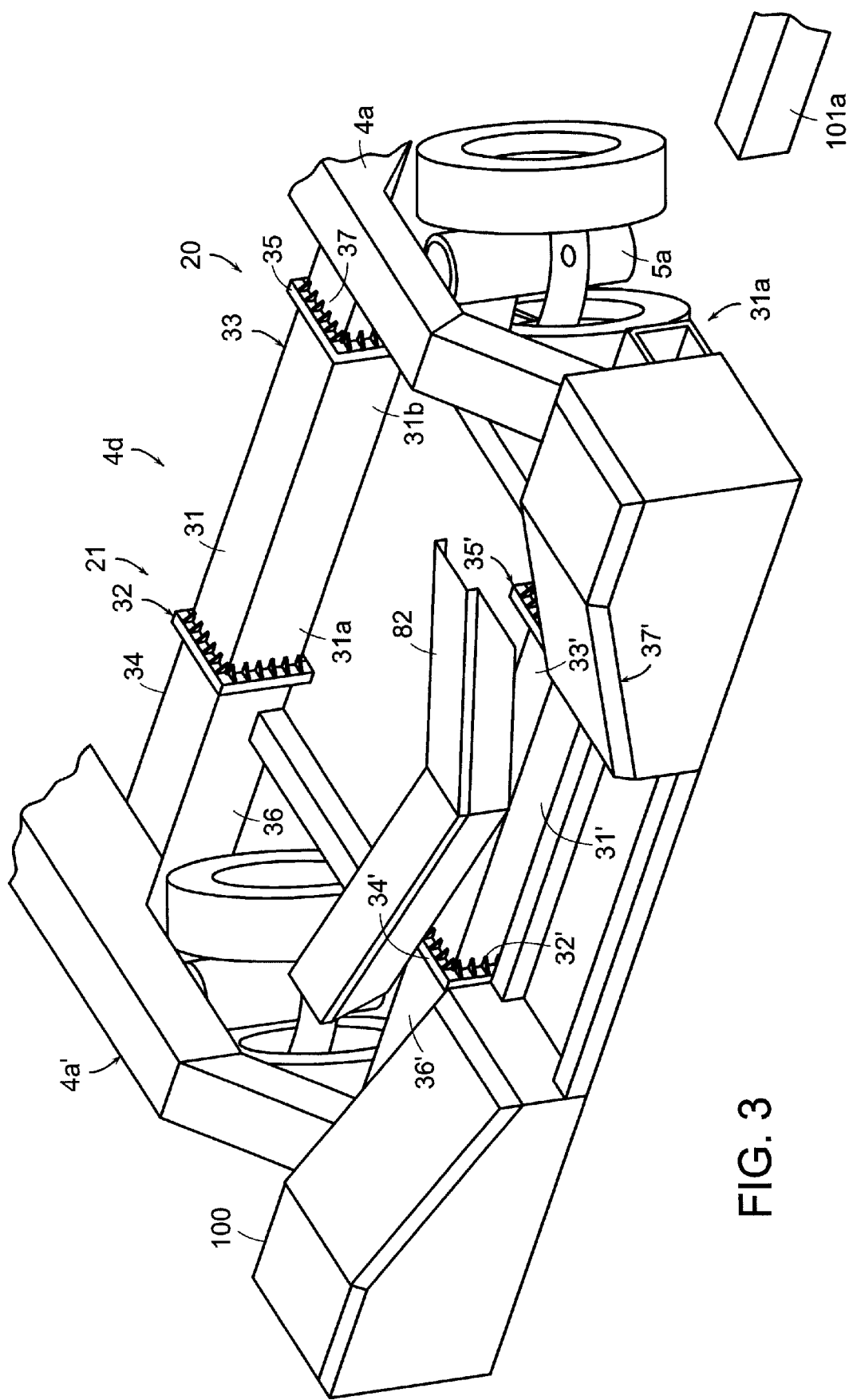
FIG. 3 illustrates a forward part of the wagon shown in FIG. 1 in slightly larger scale.

As shown in FIG. 3, the part 4d that interconnects the legs 4a, 4a' may include at least one readily removed central part 31.

The mutually opposite surfaces 31a, 31b of said central part 31 are provided with first coupling means 32, 33 for co-action with corresponding second coupling means 34, 35 belonging to adjacent parts or portions 36, 37 of said interconnecting member 4d.

Figure 2:
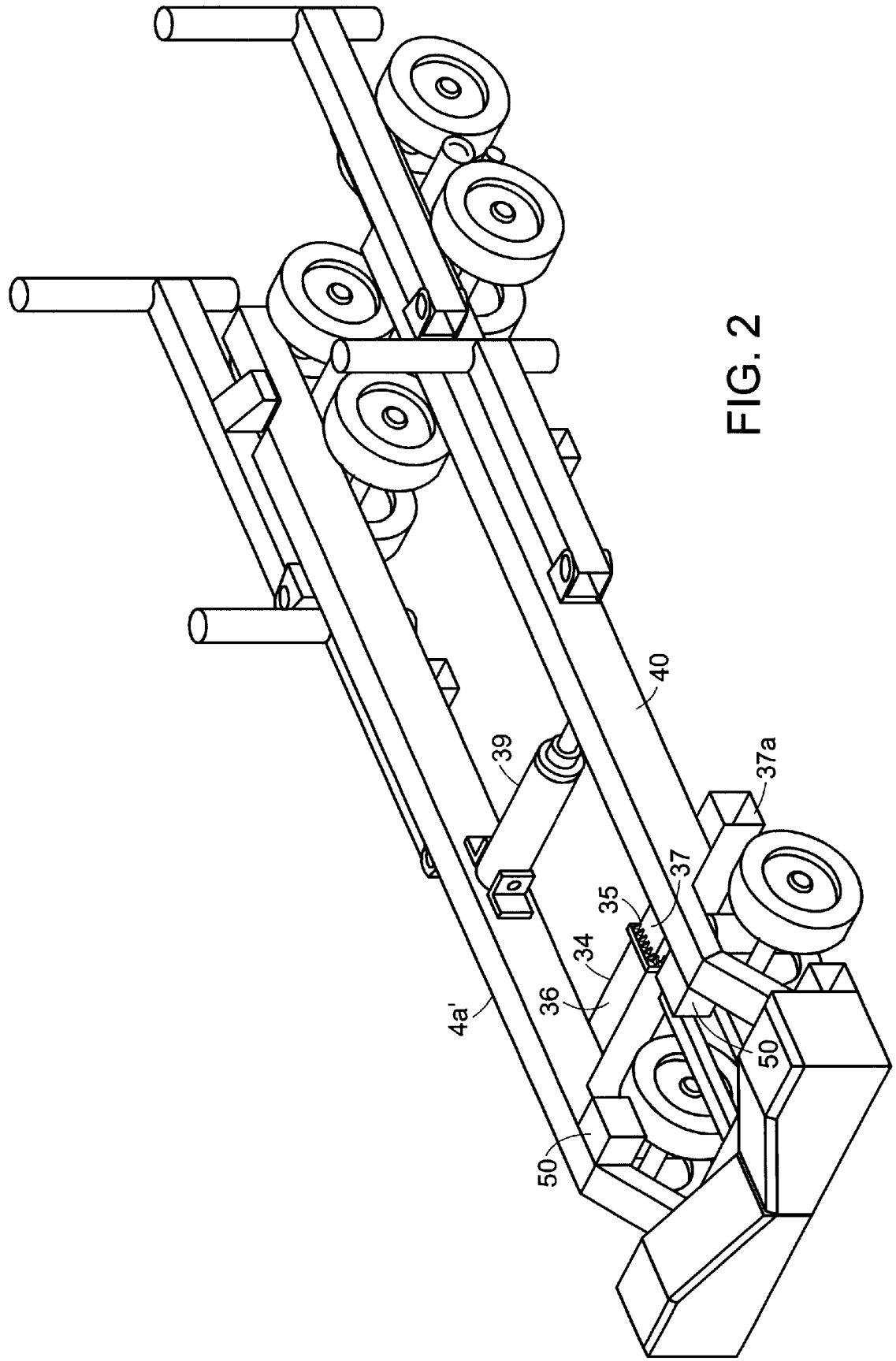
FIG. 2 is a slightly simplified perspective illustration of the wagon shown in FIG. 1, but with the legs adjusted to a narrower span so as to obtain a wagon of smaller width suitable for road transport, said smaller span being obtained by removing a sub-part.

These second, corresponding coupling means 34, 35 may conveniently be adapted to mutually form corresponding coupling means for direct co-action with each other in the absence of said central part 31, in accordance with the FIG. 2 illustration.

The central part 31 and both of the outer parts 36, 37 of the illustrated embodiment have a beam structure, such as a square or rectangular beam structure, preferably a square beam structure.

In the illustrated case, the first and second coupling means have the form of perforated flanges and bolt joints or screw joints that pass through the flange holes.

As will be seen from FIG. 3, the interconnecting member 4d conveniently comprises two mutually parallel beam-parts, such as beam-parts 31 and 31', where the latter beam-part is provided with coupling means similar to the former beam-part, said coupling means being referenced 32', 33', 34', 35' in FIG. 3.

This embodiment is further based on the concept that each leg-part 4a, 4a' shall be so constructed that its centre of gravity will be supported stably by, inter alia, wheel sets, primarily the rear boggy arrangements with wheels placed on respective sides of said leg-parts and on respective sides of the centre of gravity point of the leg-part 4a.

The interconnecting member 4d comprising said parts 31, 36, 37 may be a telescopic structure provided with coupling means different to those described and illustrated.

Rods 39 arranged parallel with said interconnecting parts 31, 31' may also be telescopic.

It will be understood from this that when the parts 31, 31' have been dismantled from the boat wagon 2, according to FIG. 1, the legs 4a, 4a', angled with respect to one another and with respect to the pressure-oil system 100, can, with the aid of said steerable wheel-pairs 5, 5' and a mechanical drive means 50 connected to the steerable wheel pairs 5, 5', be brought closer together to the position shown in FIG. 2, whereafter the parts 36 and 37 can be locked together by means of the coupling means 34 and 35.

The U-shaped support plate 82 will also accompany the interconnecting member 31' as said part is removed.

It will be understood from this that when the parts 31, 31' of the interconnecting beams shall be fitted to the wagon 2, as in FIG. 1, the legs 4a, 4a', with the aid of said steerable wheel-pairs 5, 5' angled away from each other, and the pressure-oil system 100, shall be brought from one another to the position shown in FIG. 1 and there locked together through the medium of the interconnecting parts 31 and 31' and also locked to the outer parts 36, 37 (36', 37') of the interconnecting structures with the aid of said coupling means.

By way of a complementary feature, particularly when the legs 4a, 4a' are not balanced, it is proposed in accordance with the invention that the central interconnecting member 31 is removed and a supportive beam 101 is inserted into the aperture 37a of the hollow beam-part 37 in the direction of the arrow P to an extent in which said supportive beam will also co-act with the beam-part 36.

The central interconnecting member 31' with the support plate 82 is then removed. A further beam 101a can now be inserted into the beam aperture 31a and pushed through the beam-parts.

Subsequent to having positioned the supportive beams 101 and 101a, the legs can be brought together to a position suitable for road transport and fastened together in accordance with the FIG. 2 illustration, which shows the supportive beams 101 and 101a removed.

The legs 4a, 4a' are moved wider apart to a boat-transporting position in an opposite sequence of steps, i.e. the two supportive beams 101 and 101a are moved in, the bolt joints released, the legs 4a, 4a' moved apart, one beam 101 removed and the central interconnecting parts 31 fitted, whereafter other supportive beams 101a are removed and the central interconnecting member 31' is fitted.

The support plate 82 is movable parallel with a centre line of the interconnecting member through the medium of a slide surface 81, and the most forward support point of the hull of the boat can be displaced laterally to some extent depending on the setting of said hull in the holders or support means 9, 9' and 10, 10'.

Figure 4:
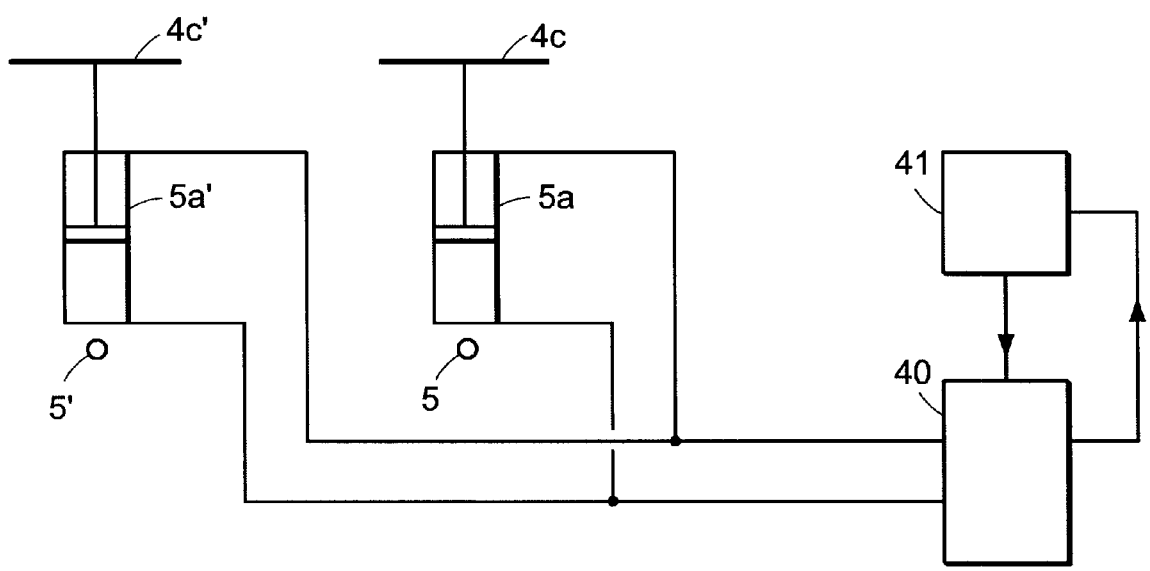
FIG. 4 illustrates an hydraulic circuit for use with two piston-cylinder devices, each of which is active between a front wheel and the actual frame structure.

FIG. 4 illustrates a hydraulic circuit arrangement for the two forward piston-cylinder devices 5a, 5a', each of which co-acts between the frame-part 4c, 4c' and the wheel-pairs 5, 5', said devices being hydraulically connected in parallel and can therefore both be raised and lowered in response to hydraulic pressure controlled by a valve 40 connected to a pressure source 41.

When the valve 40 is closed, the piston-cylinder devices 5a, 5a' provide for pendular movement which compensates for an uneven ground surface under the same pressure. By pendular movement is meant that hydraulic fluid is pressed from one cylinder to the other cylinder, and vice versa, as the wheel pairs 5, 5' run over irregular or uneven underlying surfaces, such as road surfaces.

It will be understood that the invention is not restricted to the aforedescribed and illustrated exemplifying embodiments thereof and that modifications can be made within the scope of the inventive concept as defined in the following claims.

What is claimed is:

1. A U-shaped boat wagon that is adapted to be pushed or moved along an underlying wagon supporting surface, comprising:

two legs and a legs interconnecting member configured such that the horizontal distance or span between the legs can be adjusted;

wherein the legs interconnecting member is comprised of a number of elements adapted to co-act firmly and easily removably with each other, wherein the span of the legs is adapted for a road transport by removing one or more of the removable elements, the legs can be adjusted to adapt to a second span for a boat transport by fitting one or more of the removed elements to associated first coupling means and second coupling means of the legs interconnecting member, and the wagon further includes steerable wheels and mechanical drive means, which enable the legs to be moved closer together or wider apart with the aid of said steerable wheels.

2. A wagon according to claim 1, wherein said legs interconnecting member is comprised of a beam structure.

3. A wagon according to claim 1, wherein said first and said second coupling means are comprised of flanges and screw joints.

4. A wagon according to claim 1, further including telescopic rods extending parallel with said legs interconnecting member.

5. A wagon according to claim 1, wherein said legs interconnecting member is comprised of more than two mutually parallel beam-parts.

6. A wagon according to claim 1, further including a support plate that is adapted to support a forward region of a boat carried by the wagon.

7. A wagon according to claim 1, wherein the wagon further includes a frame structure and each of the steerable wheels is supported by a piston-cylinder device that is active between said wheels and the frame structure of said wagon.

8. A wagon according to claim 7, characterized by including two the piston-cylinder devices which are hydraulically connected in parallel.

9. A wagon according to claim 8, wherein a volume of hydraulic fluid in said piston-cylinder devices is enclosed through the medium of valve means so as to allow pendular movement.

10. A U-shaped boat wagon that is adapted to moved along an underlying wagon supporting surface comprising, in combination:

two legs;

a plurality of wheel sets connected to each leg, each set of wheels comprising a pair of wheels, the wheels of each pair being positioned on opposite sides of a respective leg to support a center of gravity of the respective leg;

a legs interconnecting member connecting the two legs together and comprising two mutually parallel hollow beam parts, the beam parts having one or more removable elements such that a span of the legs is adapted for road transport by removing one or more of the removable elements, the legs can be adjusted to adapt to a second span for a boat transport, by fitting one or more of the removed elements to associated sub-parts of the legs interconnecting member; and at least one supportive beam to be inserted into a respective hollow beam part to facilitate removing one or more of the removable elements and fitting one or more of the removed elements to the associated sub parts.

11. The wagon according to claim 10, wherein mutually opposite end-parts of the removable elements are provided with first coupling means for co-action with corresponding second coupling means belonging to adjacent elements of the hollow beam parts; and the second corresponding coupling means are also adapted to mutually form corresponding coupling means therebetween.

12. A The wagon according to claim 11, wherein the first and second coupling means comprise flanges and screw joints.

13. The wagon according to claim 10, further including telescopic rods extending parallel with the legs interconnecting member.

14. The wagon according to claim 10, further including a support plate that is adapted to support a forward region of a boat carried by the wagon.

15. The wagon according to claim 10, wherein the wagon further includes a frame structure, and one set of wheels comprises a front wheel set, wherein each of the front wheels is supported by a piston-cylinder device that is active between the front wheels and the frame structure of the wagon.

16. The wagon according to claim 15, wherein two of the piston-cylinder devices are hydraulically connected in parallel.

17. The wagon according to claim 16, wherein a volume of hydraulic fluid in the piston-cylinder devices is enclosed through a medium of valve means so as to allow pendular movement.

18. The wagon according to claim 10, further including mechanical drive means and wherein the wheel sets include a set of steerable wheels, the mechanical drive means enabling the legs to be moved closer together or wider apart with the aid of the steerable wheels.

* * * * *